(12) United States Patent
Takamori

(10) Patent No.: US 6,367,300 B1
(45) Date of Patent: Apr. 9, 2002

(54) SPROCKET WITH THIN BODY AND GROOVED TEETH

(75) Inventor: Norihiko Takamori, Kyoto (JP)

(73) Assignee: Uni-Sunstar B.V., Amsterdam (NL)

(*) Notice: Subject to any disclaimer, the term of this patent is extended or adjusted under 35 U.S.C. 154(b) by 0 days.

(21) Appl. No.: 09/519,740

(22) Filed: Mar. 6, 2000

Related U.S. Application Data

(60) Division of application No. 09/061,264, filed on Apr. 17, 1998, now Pat. No. 6,142,900, which is a continuation-in-part of application No. 08/837,477, filed on Apr. 18, 1997, now abandoned.

(51) Int. Cl.⁷ ............................................. B21B 27/06
(52) U.S. Cl. .............................. 72/71; 72/102; 72/377; 29/893.32
(58) Field of Search ............................... 72/71, 82, 83, 72/84, 86, 102, 377; 29/893.32

(56) References Cited

U.S. PATENT DOCUMENTS

| | | | |
|---|---|---|---|
| 4,291,559 A | * 9/1981 | Martin | 72/84 |
| 4,555,240 A | 11/1985 | Hayashi | |
| 5,396,787 A | * 3/1995 | Kanemitsu et al. | 29/893.32 |
| 5,722,138 A | * 3/1998 | Yamanaka | 72/102 |
| 5,979,203 A | * 11/1999 | Radocaj | 72/71 |

FOREIGN PATENT DOCUMENTS

| | | |
|---|---|---|
| DE | 3141101 A1 | 9/1982 |
| EP | 0764482 A1 | 3/1997 |
| FR | 2 404 780 | 9/1977 |
| JP | 41-17567 | 8/1966 |
| JP | 50-149853 | 12/1975 |
| JP | 51-121464 | 10/1976 |
| JP | 52-163661 | 12/1977 |
| JP | 53-12160 | 2/1978 |
| JP | 54-18146 | 6/1979 |
| JP | 56-18146 | 2/1981 |
| JP | 60-104866 | 6/1985 |
| JP | 62-89563 | 6/1987 |
| JP | 63-248531 | * 10/1988 ........ 72/102 |
| JP | 6-323399 | 11/1994 |
| JP | 07275989 | 10/1995 |
| JP | 7-290181 | 11/1995 |

OTHER PUBLICATIONS

Patent Abstract of Japan, vol. 1996, No. 08, Aug. 30, 1996 and JP 08103845.

Written Opinion of International Application No. PCT/Jp98/01609 dated Jan., 1994.

* cited by examiner

*Primary Examiner*—Ed Tolan
(74) *Attorney, Agent, or Firm*—Wenderoth, Lind & Ponack, L.L.P.

(57) ABSTRACT

A sprocket includes a body, and teeth formed on the peripheral edge of the body. The teeth have a thickness greater than that of the body. This design enables the use of the existing chain and brings about a reduction in the weight of the overall sprocket.

16 Claims, 15 Drawing Sheets

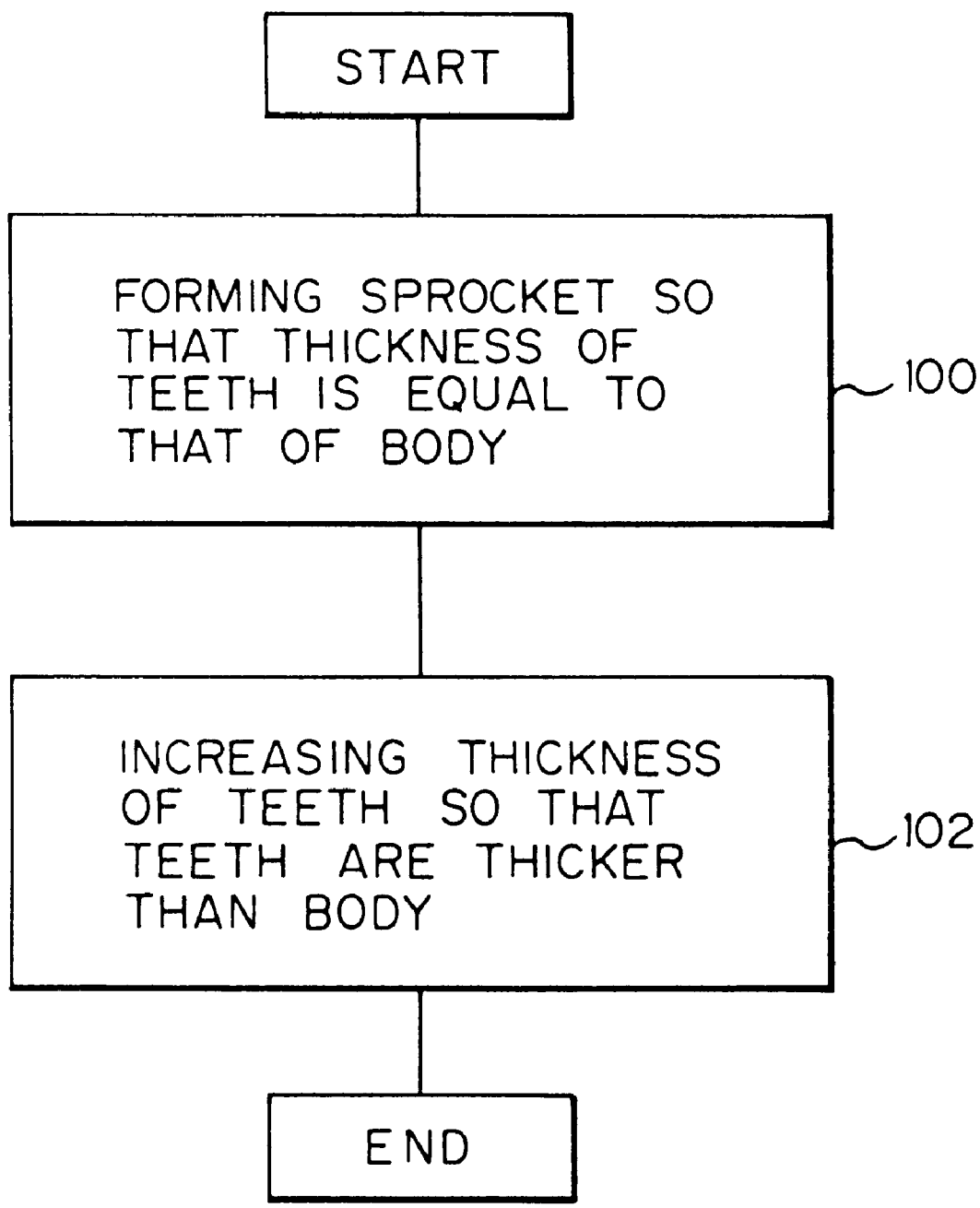

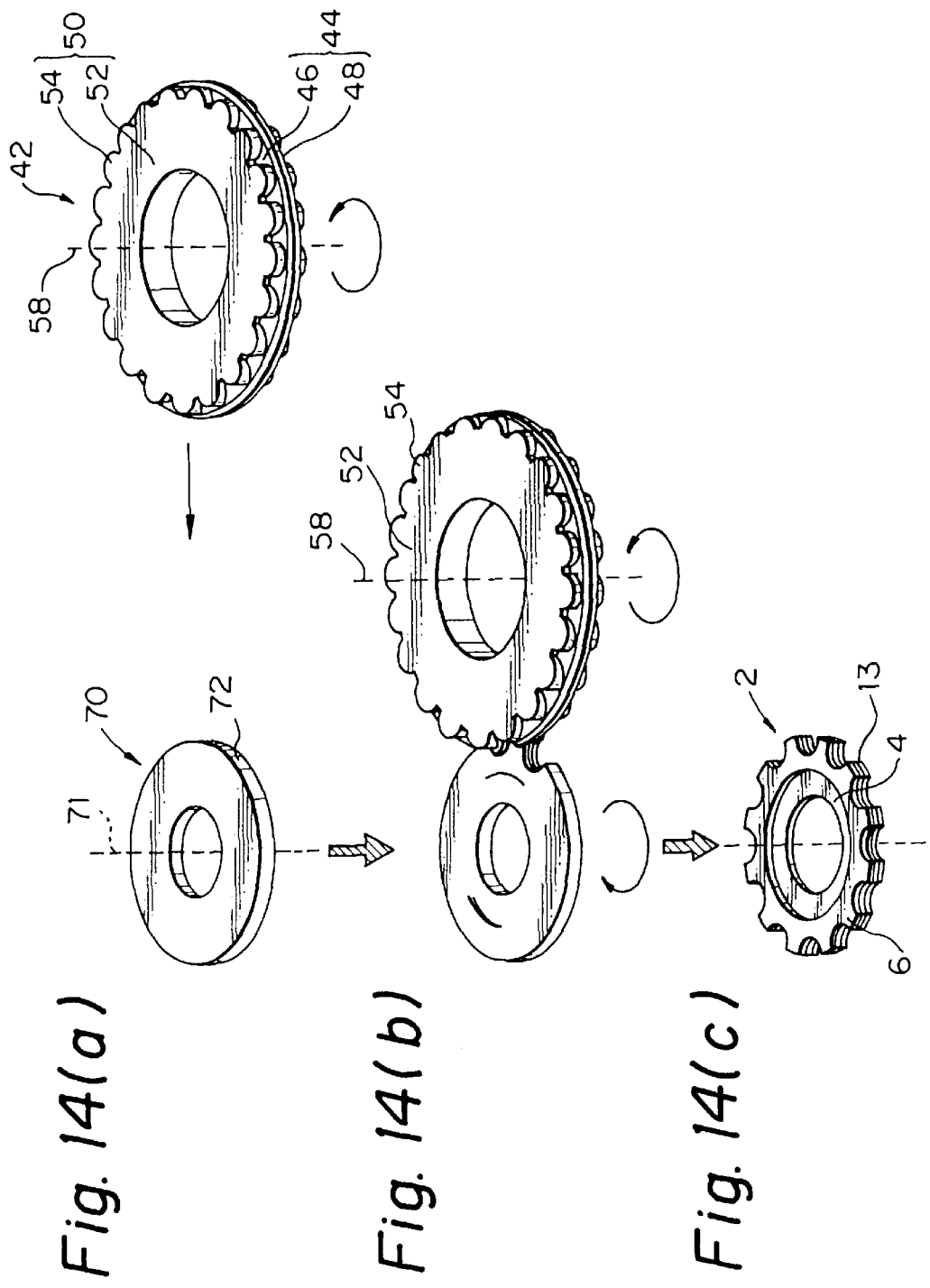

US 6,367,300 B1

SPROCKET WITH THIN BODY AND GROOVED TEETH

This is a division of application Ser. No. 09/061,264 filed Apr. 17, 1998, now U.S. Pat. No. 6,142,900 that is a Continuation-In-Part of application Ser. No. 08/837,477 filed Apr. 18, 1997, now abandoned.

BACKGROUND OF THE INVENTION

The present invention relates to sprockets and more particularly, to a sprocket with a thin body, and a method for manufacturing such a sprocket.

A known sprocket generally includes an annular body, and a plurality of integral teeth arranged on the peripheral edge of the body at equal intervals. Typically, such a sprocket is mounted on the drive or driven wheel of a motorcycle and is operatively associated with a chain. To improve fuel economy, there is a need in the motorcycle industry to reduce the weight of a motorcycle. An attempt has been made to simply reduce the thickness of the overall sprocket. However, a reduction in the thickness of the teeth requires a corresponding reduction in the width of the chain and prevents the use of an existing chain. This results in an increase in the production costs of the mechanism. Also, a narrow chain lacks durability as compared with the existing chain.

SUMMARY OF THE INVENTION

Accordingly, it is an object of the present invention to provide a sprocket which has a reduced weight and which enables the use of the existing chain.

To achieve this object, the present invention provides a sprocket comprising a substantially annular body, and a plurality of teeth arranged on the peripheral edge of the body and having a thickness greater than that of the body.

As the thickness of the teeth is greater than that of the body which occupies a substantial part of the sprocket, the sprocket can be reduced in weight and production costs. The teeth are thick enough to readily correspond with the width of the existing chain. In other words, the teeth are sufficiently thick to accept the existing chain. The present invention thus enables the use of the existing chain and enjoys the strength of the existing chain.

The present invention provides a sprocket comprising a substantially annular body, and teeth formed on the peripheral edge of the body, wherein the body has a thickness less than that of the teeth.

As the thickness of the body is less than that of the teeth, and the body occupies a substantial part of the sprocket, the sprocket can be reduced in weight and production costs. The teeth are thick enough to readily correspond with the width of the existing chain. The present invention thus enables the use of the existing chain and enjoys the strength of the existing chain.

The present invention also provides a sprocket comprising a substantially annular body having a first side, an opposite, second side, a peripheral edge, and a central axis extending centrally through the first and second sides, and a plurality of teeth arranged on the peripheral edge of the body, wherein the teeth include a first step extending radially outwardly from the first side of the body, a first side connected to the first step and extending substantially parallel to the first side of the body, a second step extending radially outwardly from the second side of the body, a second side connected to the second step and extending substantially parallel to the second side of the body, a peripheral wall extending along the peripheral edge of the body and between the first side and the second side of the teeth, and a plurality of recesses formed in the peripheral wall of the teeth.

As the thickness of the teeth is greater than that of the body which occupies a substantial part of the sprocket, the sprocket can be reduced in weight and production costs. The teeth are thick enough to readily correspond with the width of the existing chain. The present invention thus enables the use of the existing chain and enjoys the strength of the existing chain. Further, with the recesses in the peripheral wall of the teeth, the teeth have a larger area to dissipate more heat. Heat is generated by friction when the teeth of the sprocket are drivingly engaged with a chain. Such heat is dissipated through the recesses. The chain is substantially free from thermal expansion or elongation. This results in an increase in the durability of the chain. Advantageously, the recesses provide a path along which dirt or mud is removed from the chain and helps prevent dirt from adhering to the teeth. This results in a decrease in the amount of friction between the chain and the sprocket and thus, in an increase in the service life of the chain and sprocket.

The present invention additionally provides a sprocket comprising a body having a peripheral edge, and teeth formed on the peripheral edge of the body and including respective recesses formed in the peripheral wall of the teeth.

With the recesses in the peripheral wall of the teeth, the teeth have a larger area to dissipate more heat. Heat is generated by friction when the teeth of the sprocket are drivingly engaged with a chain. Such heat is dissipated through the recesses. The chain is substantially free from thermal expansion or elongation. This results in an increase in the durability of the chain. Advantageously, the recesses provide a path along which dirt or mud is removed from the chain and helps prevent dirt from adhering to the teeth. This results in a decrease in the amount of friction between the chain and the sprocket and thus, in an increase in the service life of the chain and sprocket.

According to another aspect of the present invention, there is provided a method for manufacturing a sprocket which comprises a first step of preparing a sprocket which includes a body having a peripheral edge, and teeth arranged on the peripheral edge of the body and having a thickness substantially equal to that of the body, and a second step of increasing the thickness of the teeth so that the teeth are made thicker than the body.

As the body which occupies a substantial part of the sprocket is thin, the sprocket can be reduced in weight and production costs. The teeth are thick enough to readily correspond with the width of the existing chain. The present invention thus enables the use of the existing chain and enjoys the strength of the existing chain.

The present invention also provides a method for manufacturing a sprocket which comprises a first step of preparing a workpiece having a peripheral edge, and a second step of forming a plurality of teeth on the peripheral edge of the workpiece at given intervals, with the teeth having a thickness greater than that of the workpiece.

As the body which occupies a substantial part of the sprocket is thin, the sprocket can be reduced in weight and production costs. The teeth are thick enough to readily correspond with the width of the existing chain. The present invention thus enables the use of the existing chain and enjoys the strength of the existing chain. Moreover, the teeth are made thicker than the rest of the workpiece during formation of the teeth. This results in a decrease in the number of production steps and costs of the sprocket.

The present invention also provides a method for manufacturing a sprocket which comprises a first step of preparing a sprocket including a body having a peripheral edge, and teeth arranged on the peripheral edge of the body and having a thickness equal to that of the body, and a second step of decreasing the thickness of the body so that the body is formed to be thinner than the teeth.

As the body which occupies a substantial part of the sprocket is made thin, the sprocket can be reduced in weight and production costs. The teeth are thick enough to readily correspond with the width of the existing chain. The present invention thus enables the use of the existing chain and enjoys the strength of the existing chain.

According to a further aspect of the present invention, there is provided a circular toothed disk comprising an annular body having a peripheral edge, and teeth arranged on the peripheral edge of the body and having a thickness greater than that of the body, wherein the teeth have recesses formed in the peripheral wall of the teeth.

The present invention also provides a circular toothed disk comprising an annular body having a peripheral edge, and teeth arranged on the peripheral edge of the body, wherein the body has a thickness less than that of the teeth, and the teeth have recesses formed in the peripheral wall of the teeth.

According to a still further aspect of the present invention, there is provided a machine for manufacturing a sprocket, wherein a plurality of teeth are formed on the peripheral edge of a workpiece at given intervals and have a thickness greater than that of the workpiece. The machine comprises a tooth forming tool rotatably pressed against the workpiece, a drive adapted to drivingly rotate the tooth forming tool, and a transfer unit for reciprocatingly moving the tooth forming tool and the drive relative to the workpiece.

The teeth are formed in the peripheral edge of the workpiece while at the same time, the teeth are made thicker than the rest of the workpiece. The present invention is thus capable of reducing the number of production steps and the production costs of the sprocket.

Other features and advantages of the present invention will become apparent to those skilled in the art from the following detailed description, claims and drawings.

BRIEF DESCRIPTION OF THE DRAWINGS

FIG. 7 is a flow chart showing a method for manufacturing the sprocket;

FIG. 14($a$) is a perspective view showing the manner in which a tool is moved toward a workpiece;

FIG. 14($b$) is a view similar to that of FIG. 14($a$), but showing the manner in which the tool is pressed against the workpiece;

FIG. 14($c$) is a perspective view of the sprocket in its final form;

Figure 1:
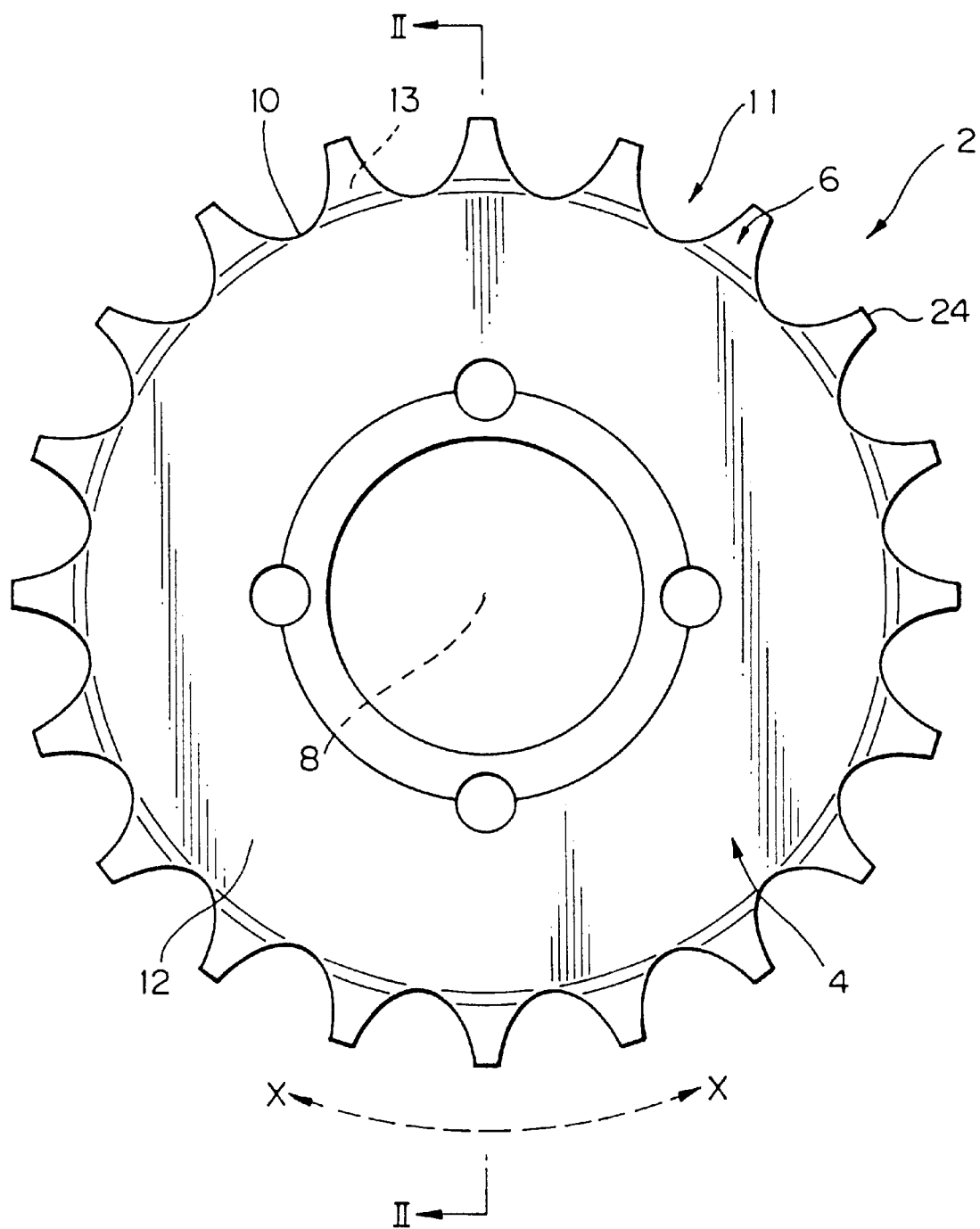
FIG. 1 is a front view of a sprocket according to a first embodiment of the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENTS

A sprocket according to one embodiment of the present invention will now be described with reference to the accompanying drawings.

Illustratively, a sprocket 2 includes a generally annular body 41 and a plurality of integral teeth 6 arranged on the periphery of the body 4. The body 4 has a central axis 8, a peripheral edge 10 extending about the central axis, and a pair of opposite sides, that is, a first side 12 and a second side 14. The central axis 8 extends centrally through the first side 12 and the second side 14 of the body 4.

Figure 3:
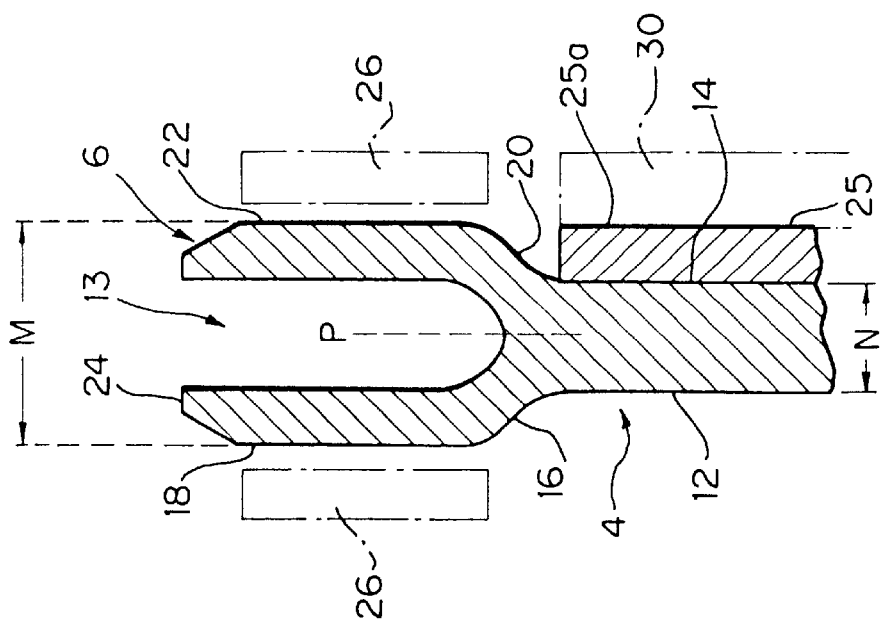
FIG. 3 is a sectional view, on an enlarged scale, of part of the sprocket shown in FIG. 2.

The teeth 6 are arranged on the peripheral edge 10 of the body 4 at equal Intervals. A plurality of arcuate recesses 11, i.e. first recesses herein, are formed between adjacent teeth 6. As shown in FIG. 3, the body 4 has a thickness N in the direction of the axis 8. The teeth 6 have a thickness M which is greater than the thickness N of the body 4. In other words, the body 4 is thinner than the teeth 6. A reduction in the thickness of the body 4 results in a corresponding reduction in the weight and the production costs of the overall sprocket. For example, the thickness of the body 4 can be substantially half of that of the body of a conventional sprocket. The teeth 6 have a thickness greater than that of the body 4 and are identical in thickness to those of a conventional sprocket (typically, 5.8 mm, 7.2 mm or 8.7 mm). This design enables the use of a conventional chain, the width of which is typically, 6.35 mm, 7.94 mm or 9.53 mm. Thus, the present invention eliminates the need for a new chain and enjoys the strength of the existing chain. The sprocket 2 may be mounted to the drive or driven wheel of a motorcycle. As the sprocket is reduced in weight, such a motorcycle provides better fuel economy.

Each of the teeth 6 includes a first step 16 extending radially outwardly from the first side 12 of the body 4, a first side 18 extending radially outwardly from the first step 16 in parallel relation to the first side 12 of the body 4, a second step 20 extending radially outwardly from the second side 14 of the body 4, a second side 22 extending radially outwardly from the second step 20 in parallel relation to the second side 14 of the body 4, a peripheral wall 24 provided radially outwardly of and extending along the peripheral edge 10 of the body 4, and recesses or grooves 13, i.e. second recesses herein formed in the peripheral wall 24 of the teeth. The first and second steps 16 and 20 are formed to extend away from the first and second sides 12 and 14, respectively.

Figure 4:
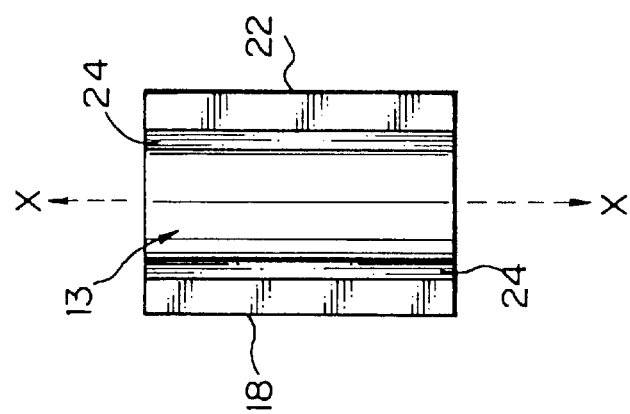
FIG. 4 is a plan view of one tooth of the sprocket shown in FIG. 3.

The grooves 13 are defined in and extend radially inwardly from the peripheral wall 24 of the teeth. Preferably, the grooves 13 are located centrally in the peripheral wall 24 of the teeth. Also, the grooves 13 preferably extend through the teeth 6 along the circumference of the body 4 as shown by the arrow X in FIGS. 1 and 4.

The grooves 13 are formed, for example, by pressing substantially the center of the peripheral wall 24 of the teeth 6. As a result, the first side 18 and the second side 22 of the teeth 6 are axially outwardly urged and extended beyond the first side 12 and the second side 14 of the body 4 so that the thickness M of the teeth 6 is greater than the thickness N of the body 4.

With the grooves 13, the teeth 6 have a larger area to dissipate more heat. Typically, heat is generated by friction when the teeth 6 are drivingly engaged with an associated chain. Advantageously, such heat is dissipated through the grooves 13. Thus, the chain is substantially free from thermal expansion or elongation. This results in an increase in the service life of the chain as well as the sprocket.

Also, each of the grooves 13 serves as a flow path for allowing dirt or mud adhering to the chain to move through the grooves, thereby substantially preventing dirt from adhering to the teeth. This brings about a reduction in the amount of friction between the chain and the sprocket and thus, increases the service life of the chain and sprocket. The grooves 13 extend through the teeth 6 and cooperate together to provide the sprocket with a path along which dirt can be removed.

With the sprocket according to the first embodiment of the present invention, the first step 16 enables the first side 12 of the body 4 to be offset from the first side 18 of the teeth 6. Similarly, the second step 20 enables the second side 14 of the body to be offset from the second side 22 of the teeth 6.

A spacer 25 may be attached to the second side 14 of the body 4. The spacer 25 is in the form of a thin plate and has an outer surface 25a. The spacer 25 may have a thickness so that the outer surface 25a of the spacer 25 becomes flush with the second side 22 of the teeth 6 when the spacer 25 is attached to the second side 14 of the body 4. The spacer 25 may be secured to a sprocket mount 30 (as shown by a broken line in FIG. 3) before the sprocket 2 is attached to the sprocket mount 30. This arrangement readily enables the teeth 6 to be positioned relative to the sprocket mount 30 as is conventional. In other words, the distance between the sprocket mount 30 and the center line P of a chain 26 as shown by a broken line in FIG. 3 (or the center line of the teeth 6) is identical to that of a conventional sprocket. Thus, there is no need to provide a new chain. Also, the sprocket can be mounted to the sprocket mount 30 in a known manner.

Figure 6:
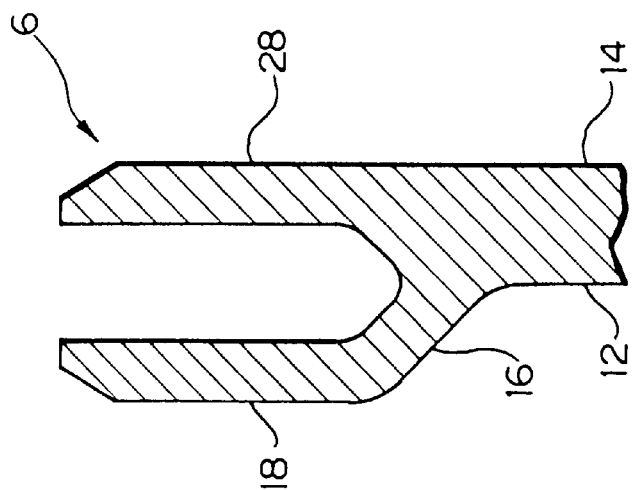
FIG. 6 is a sectional view, on an enlarged scale, of part of the sprocket shown in FIG. 5.
Figure 5:
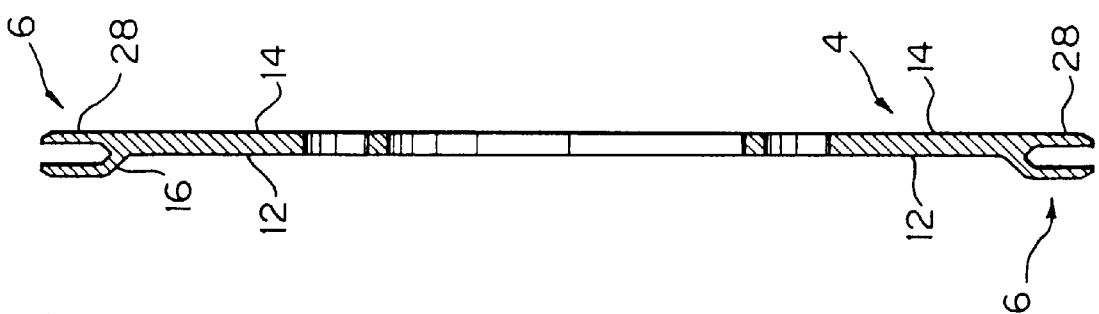
FIG. 5 is a view similar to FIG. 2, but showing a sprocket according to a second embodiment of the present invention.

A sprocket according to a second embodiment of the present invention will next be described with reference to FIGS. 5 and 6. Like parts are given like reference numerals and will not be described in detail.

A sprocket includes a body 4. The body 4 has a first side 12 and a second side 14. Each tooth 6 has a pair of opposite sides, that is, a first side 18 and a second side 28. The second side 28 of the tooth 6 is flush with second side 14 of the body 4. The sprocket 4 is attached to a sprocket mount 30 with the second side 14 held in contact with the sprocket mount 30. With this arrangement, the distance between the sprocket mount 30 and the center line P of the chain can be made identical to that of a conventional sprocket without the need for the spacer 25 used in the first embodiment.

Reference will now be made to a method and machine for manufacturing the sprockets.

Referring to FIG. 7, a method for manufacturing the sprocket comprises a first step 100 of forming a sprocket wherein the thickness of the body 4 is identical to that of the teeth 6, and a second step 102 of increasing the thickness of the teeth 6 so that the teeth 6 are thicker than the body 4.

The first step 100 may be performed by casting, forging, rolling or other known processes.

The second step 102 comprises the steps of pressing substantially the center of the peripheral wall 24 of the teeth 6 so as to form the recesses or grooves 13 in the teeth 6, and outwardly extending the first side 18 and the second side 22 of the teeth beyond the body 4 so that the thickness of the teeth 6 is greater than the thickness of the body 4.

Figure 8:
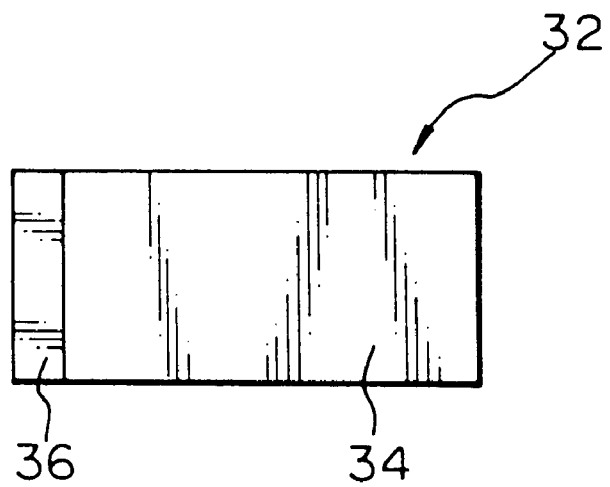
FIG. 8 is a plan view of a tool for use in the method shown in FIG. 7.
Figure 9:
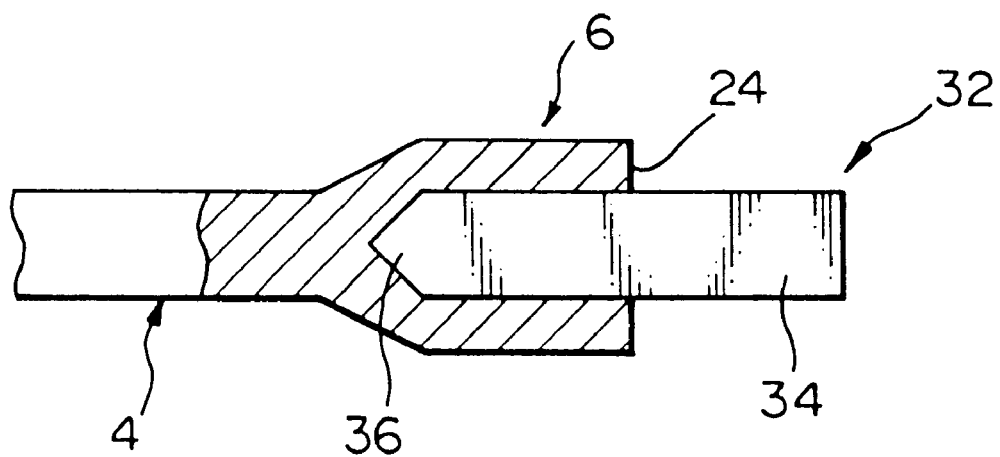
FIG. 9 is a side view, partly in section, of part of a workpiece with the tool being forced into the workpiece.

Referring specifically to FIGS. 8 and 9, a hand tool 32 is used in the second step 102 to form the teeth 6 so that the teeth 6 are thicker than the body 4. The tool 32 has a body 34 of a substantially rectangular shape as viewed in plan, and a tip 36 tapered outwardly from the body 4. The tip 36 is pressed against the peripheral wall 24 of the teeth 6 so that the teeth 6 are thicker than the body 4. The tool 32 may be mounted to a press machine to automatically perform the second step.

Reference will next be made to another method and machine for manufacturing the sprockets.

Figure 10:
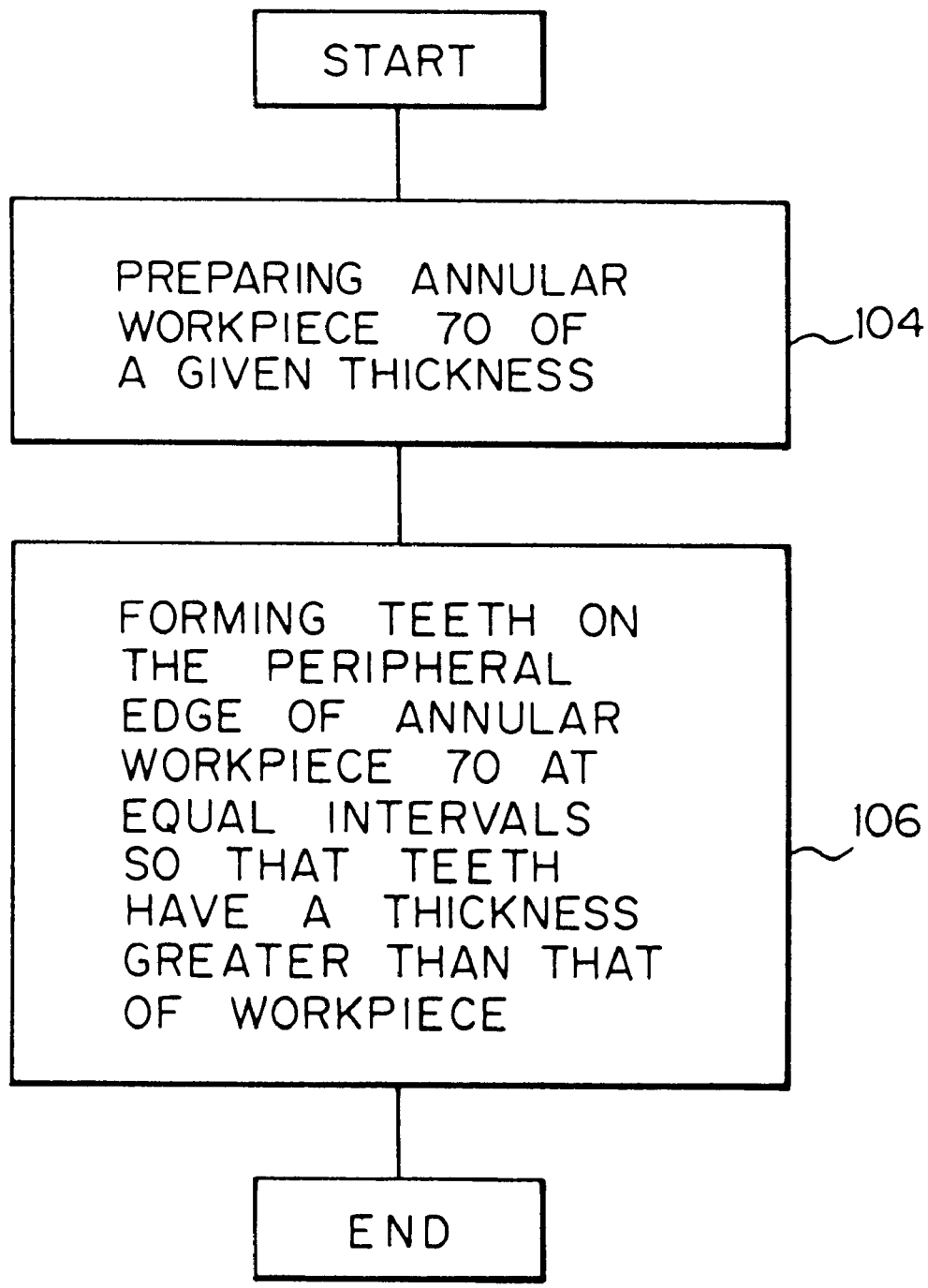
FIG. 10 is a flow chart showing another method for manufacturing the sprocket.

Referring to FIG. 10, another method comprises a first step 104 of preparing an annular workpiece or ring 70, and a second step 106 of forming a plurality of teeth on the peripheral edge of the annular workpiece 70 at equal intervals so that the teeth have a thickness greater than that of the annular workpiece 70.

Figures 15A, 15B, 15C:
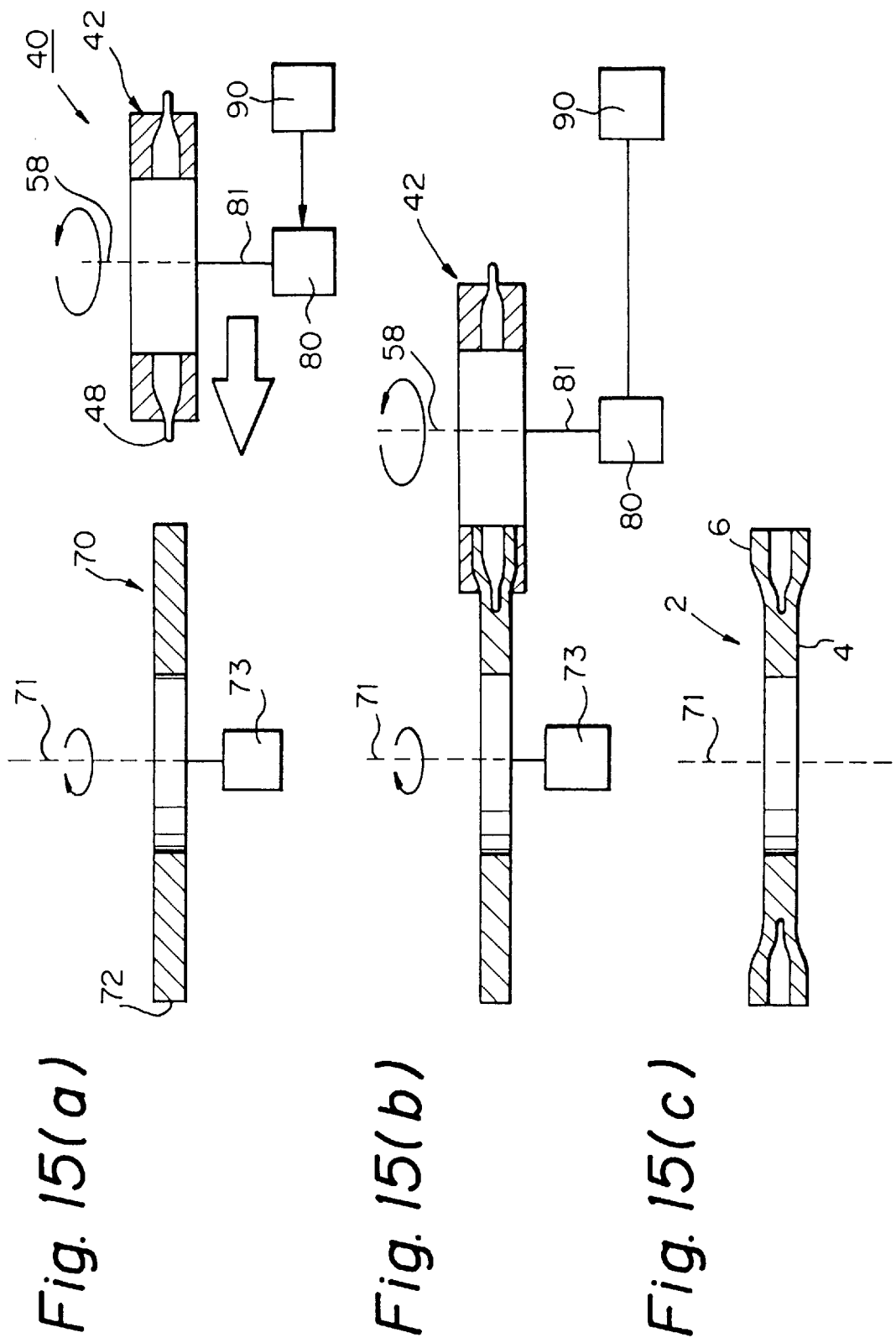
FIGS. 15($a$) to 15($c$) are schematic side views showing a sequence of operation of a rotary press machine.

The annular workpiece 70 can be made by pressing, casting, forging or other known processes. As shown in FIGS. 14(a) and 15(a), the annular workpiece 70 has a central axis 71, and a peripheral edge 72 extending about the central axis 71.

The second step 106 may be performed by a rotary press machine 40 shown in FIGS. 15(a) and 15(b).

The rotary press machine 40 includes a tooth forming tool 42, a motor 80 to drivingly rotate the tooth forming tool 42, and a transfer unit 90 for horizontally moving the tooth forming machine 42 and the motor 80 to and from the workpiece.

The motor 80 includes an output shaft 81. The tooth forming tool 42 is detachably mounted to the free end of the output shaft 81. The motor 80 is energized to rotate the output shaft 81 whereby the tooth forming tool 42 is rotated about a central axis 58.

The components of the machine are only schematically shown in FIGS. 15(a) and 15(b) for ease of illustration. Similarly, some of the components are omitted from FIGS. 14(a)–14(c).

Figure 11:
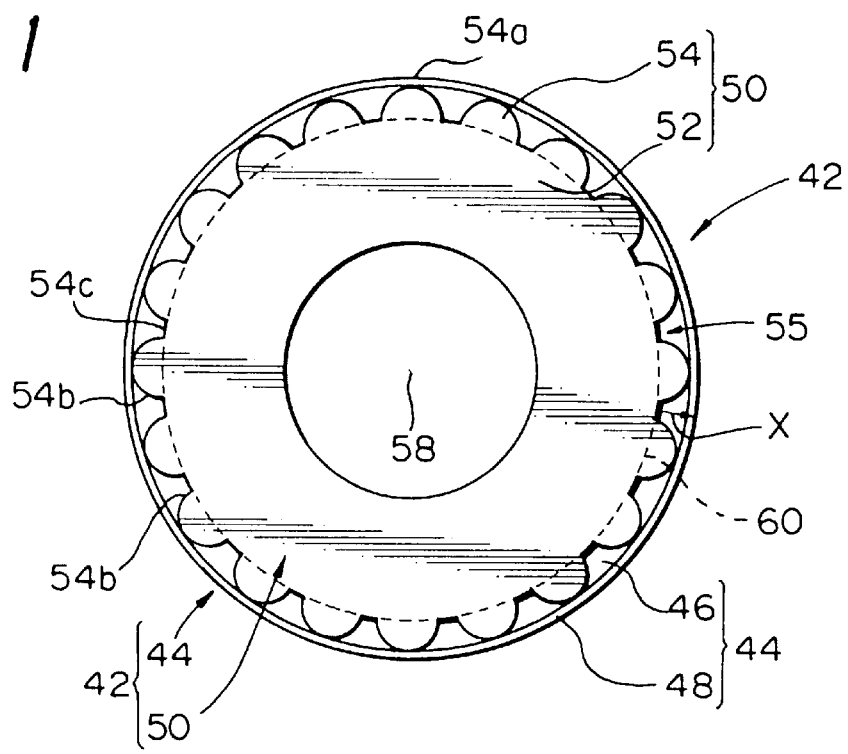
FIG. 11 is a plan view of a tooth forming tool used to manufacture the sprocket shown in FIG. 10.
Figure 12:
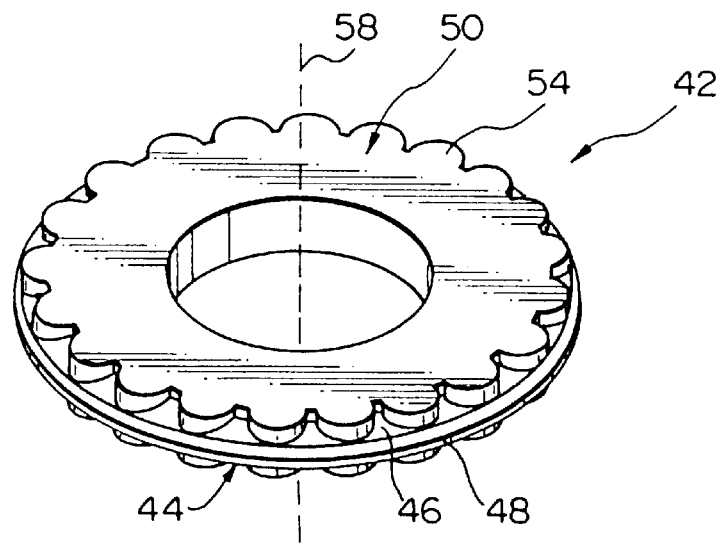
FIG. 12 is a perspective view of the tooth forming tool shown in FIG. 11.
Figure 13:
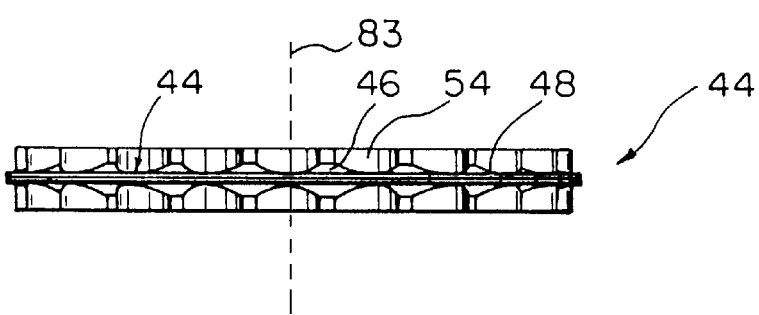
FIG. 13 is a side view of the tooth forming tool shown in FIG. 11.

Referring to FIGS. 11 to 13, the tooth forming tool 42 includes a press member 44 adapted to directly press substantially centrally the peripheral wall 24 of the teeth 6 along the circumference of the teeth 6, and a tooth forming member 50 adapted to hold the press member 44 and to form the teeth 6 on the peripheral edge 72 of the workpiece 70 at equal intervals.

The tooth forming member 50 includes an annular body 52, and a plurality of integral projections 54 arranged on the periphery of the body 52 at regular intervals. The body 52 has a vertical central axis 58 and a peripheral edge 60 extending about the central axis 58. As described earlier, the projections 54 are integrally formed on the peripheral edge 60 of the body 52 and arranged at regular intervals to define recesses 55 between adjacent projections 54. Each of the recesses 55 has a pair of inclined sides 54b, 54b and a bottom or root 54c between adjacent projections 54. The recesses 55 have a shape complimentary to that of the teeth 6. The tooth forming member 50 is pressed against the workpiece 70 while the tooth forming tool 42 is being rotated by the motor. As a result, the teeth 6 are gradually formed on the workpiece 70 by such rolling. Each of the projections 54 has a tip 54a. At the last stage of this process, the tip 54a of each of the projections 54 is positioned in the bottom of the teeth 6.

The press member 44 is generally in the form of a ring. The press member 44 extends along the circumference of the tooth forming member 50 and is located centrally in the peripheral edge 60 of the tooth forming member 50. The press member 44 includes a body 46 extending radially outwardly from the peripheral edge 60, and an edge 48 extending radially outwardly from the body 46.

The press body 46 extends horizontally from the peripheral edge 60 and is then tapered toward the tip 54a of the projections 54. The edge 48 is also tapered from the body 46 to form a cutting edge.

With this arrangement, the press member 44 is pressed against the peripheral edge 72 of the workpiece 70 while it is being rotated. Then, the grooves 13 are gradually formed in the entire peripheral edge 72 of the workpiece 70. Therefore, the teeth 6 are formed while the teeth 6 are axially extended beyond the body 4. In this embodiment, the depth of the grooves 13 of the teeth 6 is substantially equal to a distance X (see FIG. 11) between the peripheral edge 60 and the edge 48.

The use of the rotary press machine 40 will be described with reference to FIGS. 14(a)–15(c).

A holder 73 (see FIG. 15(a)) is placed adjacent to the rotary press machine 40. The holder 73 is of a known structure and only schematically shown in FIG. 15(a). First, the annular workpiece 70 is rotatably mounted to the holder 73 as shown in FIGS. 14(a) and 15(a). At this time, the workpiece 70 is positioned so that the edge 48 faces against the center of the peripheral edge 72 of the workpiece 70.

Next, the motor 80 is energized to rotate the tooth forming tool 42. The transfer unit 90 is then operated to move the motor 80 together with the tool 42 toward the workpiece 70.

The tool 42 is pressed against the workpiece 70 with the tool 42 being rotated. The workpiece 70 and the tool 42 are rotated in opposite directions. A substantial pressure is applied from the tool 42 to the workpiece 70 whereby the shape of the tool 42 is transferred to the workpiece 70 as shown in FIGS. 14(b) and 15(b). More specifically, the press member 44 is first brought into contact with the peripheral edge 72 of the workpiece 70 while the tool 42 is rotated about its own axis 71. The projections 54 are then pressed against the peripheral edge 72 of the workpiece 70. At this time, the peripheral edge 72 of the workpiece 70 is plastically deformed to thereby gradually form the teeth 6 on the peripheral edge of the workpiece 70. The taper edge 48 of the press member 44 is then urged into the peripheral edge 72 of the workpiece 70. The body 46 of the press member 44 is then forced into the peripheral edge 72 of the workpiece 70 whereby the grooves 13 are formed in the teeth 6. The grooved teeth 6 are outwardly split by the taper edge 48 and the taper body 46 until the first side 18 and the second side 22 of the teeth 6 are extended beyond the sprocket body 4.

As described earlier, the teeth 6 are made thicker than the workpiece while they are formed on the peripheral edge of the workpiece 70 as shown in 14(c) and 15(c). This method is thus capable of reducing the number of production steps and effectively manufacturing the sprockets on a commercial basis.

In the illustrated embodiment, the projections 54 are integral with the tool body 52. Alternatively, a plurality of cylindrical rollers (not shown) are rotatably mounted to the peripheral edge of the tool body 52. In such a case, the press member 44 may have openings to loosely receive the rollers. The rollers are adapted to guide the teeth and resist deformation of the teeth when the teeth are split outwards.

In the illustrated embodiment, the rotary press machine 40 is moved to and from the workpiece 70. However, the invention is not limited thereto. For example, the workpiece 70 may be moved to and from the rotary press machine 40.

The method may include an additional step of finishing the workpiece so that the teeth 6 have a required thickness after the teeth 6 become thicker than the body 4.

In the illustrated embodiment, the grooved teeth are split outwards so that the teeth are thicker than the body. However, the invention is not limited thereto. The body may be machined so that the teeth are thicker than the body. A lathe or similar cutting tools may be used to cut the body until the body is thinner than the teeth.

The sprocket is preferably mounted to the rear wheel of a motorcycle. The invention is not limited thereto. The sprocket may be used with a conveyor chain, a bicycle, a chain saw or any other means which require the use of a chain to transmit rotary motion.

The sprocket may further comprise noise reduction means for reducing noise generated by contact between the sprocket and a chain. Such a sprocket will be described below. Like parts are given like reference numerals and will not be described in detail.

Figure 2:
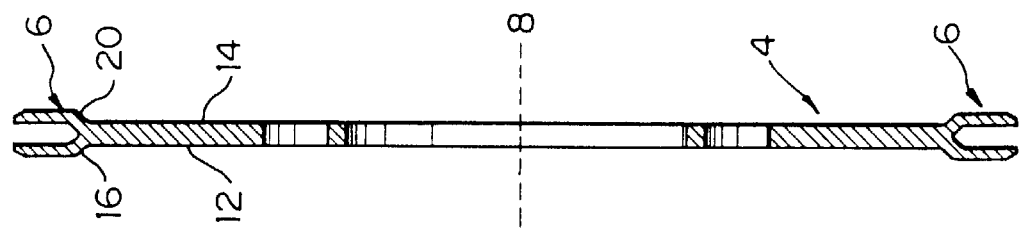
FIG. 2 is a sectional view taken on the line II—II in FIG. 1.
Figure 16:
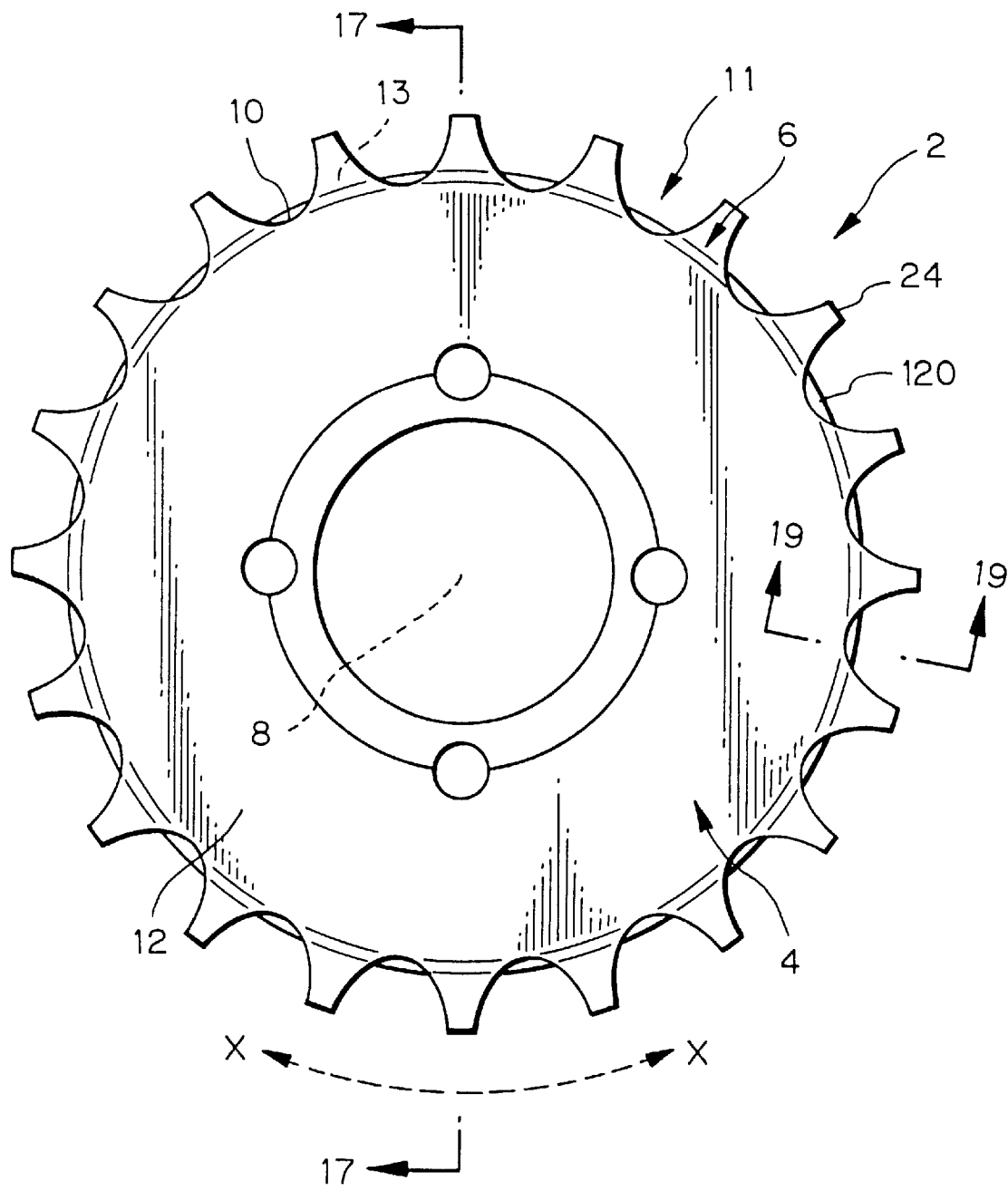
FIG. 16 is a front view of a sprocket according to a third embodiment of the present invention.
Figure 17:
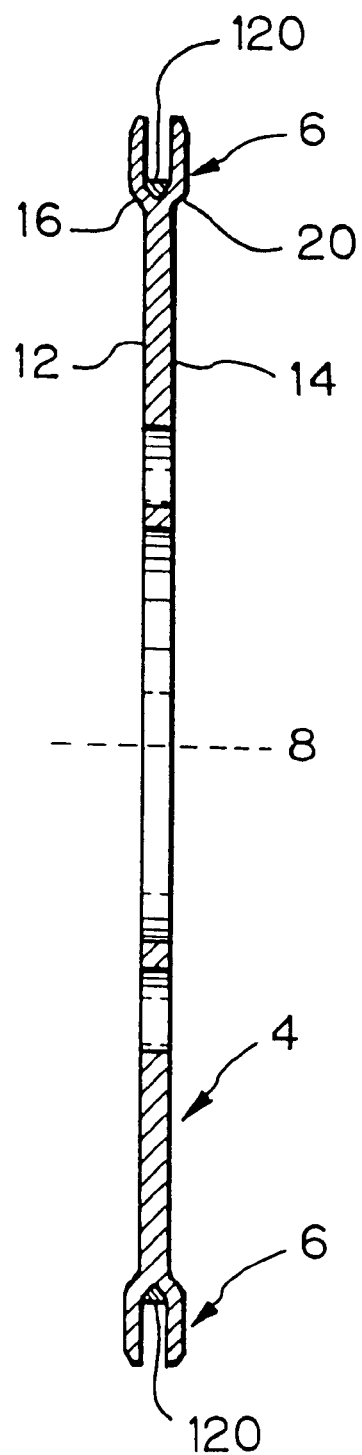
FIG. 17 is a sectional view of the sprocket shown in FIG. 16, taken along the line 17—17.
Figure 18:
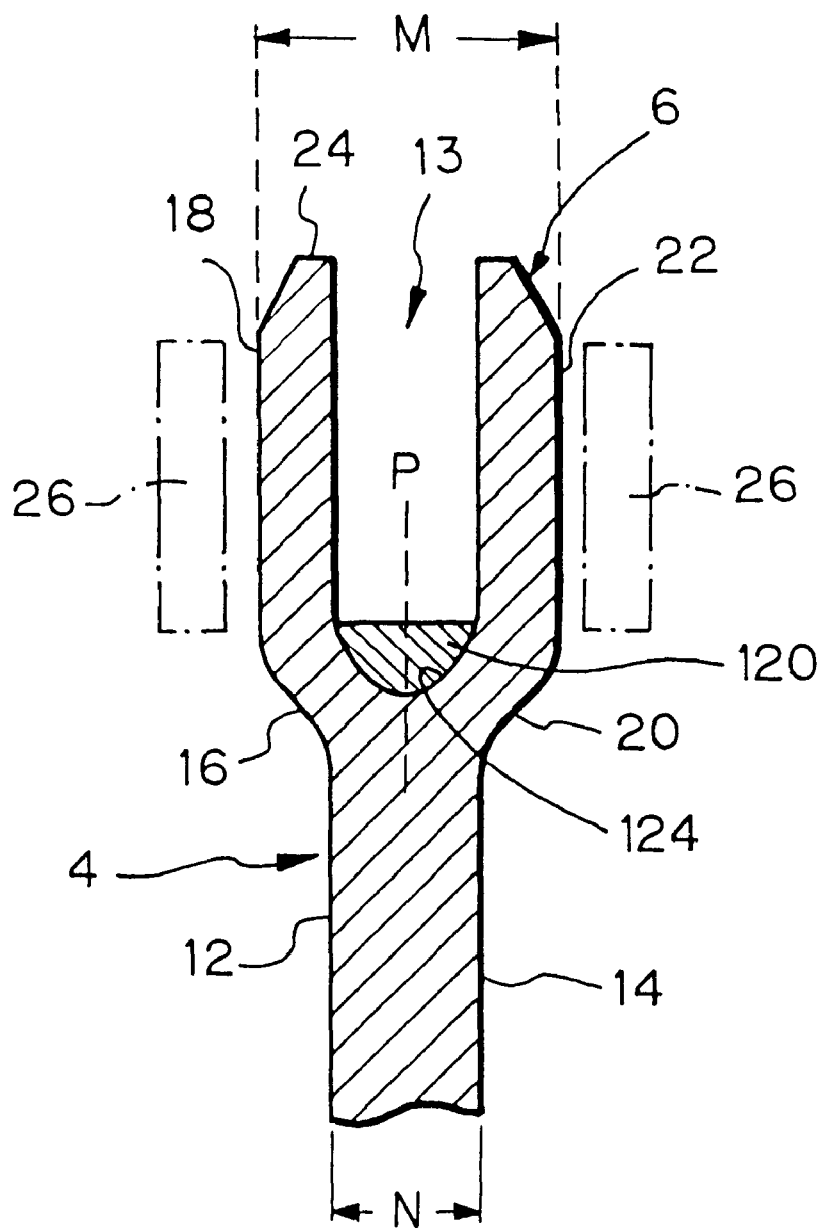
FIG. 18 is a sectional view, on an enlarged scale, of part of the sprocket shown in FIG. 17.

First, a sprocket according to a third embodiment of the present invention will next be described with reference to FIGS. 16, 17 and 18. With the sprocket according to the third embodiment of the present invention, as shown in FIGS. 16, 17 and 18, a flexible and elastic rubber annular cushioning material 120 is provided as noise reduction means along the entire circumference of the sprocket 2 shown in FIGS. 1, 2 and 3.

The annular cushioning material 120 is located along the recesses 11 formed between adjacent teeth 6 and the grooves 13 formed in the peripheral wall 24 of the teeth 6. Thus, with this arrangement, rollers (not shown) of the chain 26 are brought into contact with the cushioning material 120 in the recesses 11 upon engagement between the chain 26 and the sprocket 2, so that noise generated by contact between the sprocket and the chain can be suppressed.

Figure 19:
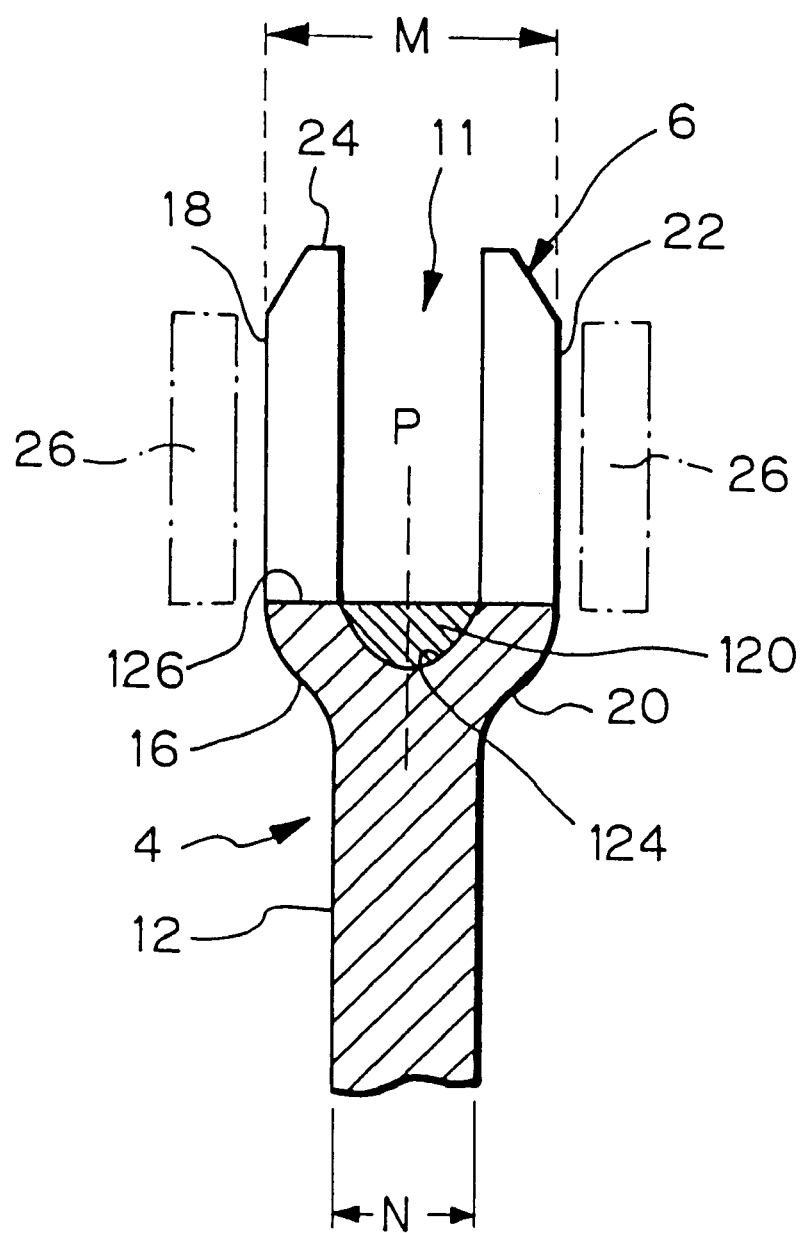
FIG. 19 is a fragmentary enlarged sectional view of the sprocket shown in FIG. 16, taken along the line 19—19.

More specifically, since the sprocket 2 according to the third embodiment is provided by the method as shown in FIGS. 11 to 15(c), an annular concave portion 124 is formed on the entire circumference of the sprocket 2. In other words, the annular concave portion 124 is provided along bottoms 126 of the recesses 11 and the bottoms of the grooves 13. As shown in FIG. 19, each of the recesses 11 has the bottom 126 thereof partially defining the recess 11. The concave portion 124 is formed on the bottom 126 of the recess. The cushioning material 120 is fixedly mounted on the annular concave portion 124 so that the upper surface of the cushioning material 120 is substantially flush with the bottom 126. Thus the cushioning material 120 does not substantially project over the bottom 126, thereby allowing an amount of deformation of the cushioning material 120 caused by contact between the sprocket rollers and the cushioning material 120 to be decreased to prevent the cushioning material 120 from being subject to damage for a long time.

In the third embodiment of the present invention, the cushioning material 120 is provided along the entire circumference of the sprocket. However, in the present invention, the cushioning material need not be provided along the entire circumference of the sprocket. Separately formed cushioning materials may be provided in the annular concave portion 124 at each of the recesses 11.

The cushioning material can be fixed, by an adhesive, to the annular concave portion 124. The cushioning material may be fixed to the annular concave portion 124 by curing or vulcanization. Fixing of the cushioning material to the annular concave portion 124 enables scattering of the cushioning material 120 to be prevented, even if the cushioning material 120 is damaged and degraded by deposition of sand and dust to the cushioning material 120 causing wear of the cushioning material.

Figure 20:
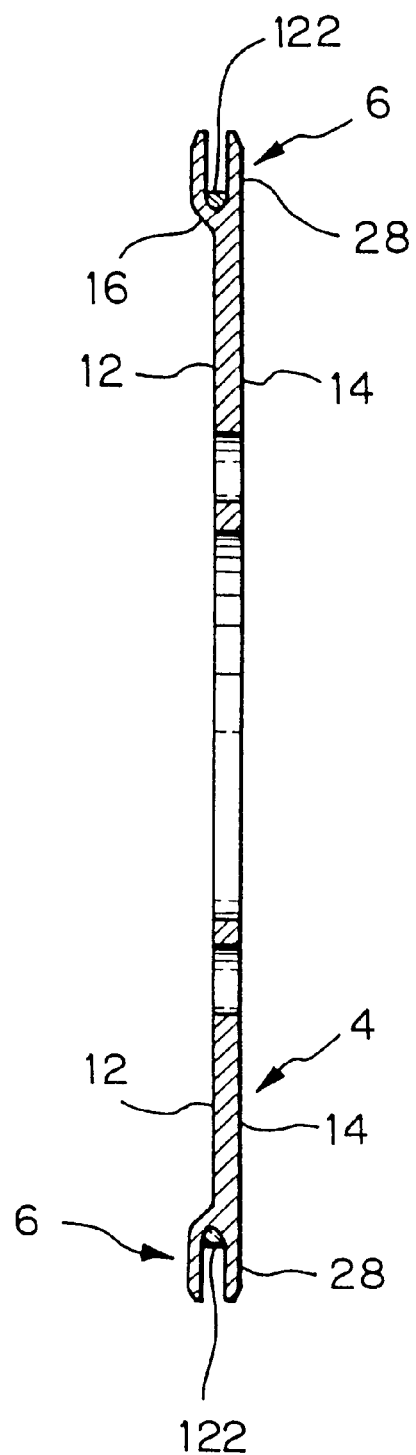
FIG. 20 is a sectional view of a sprocket according to a fourth,embodiment of the present invention.
Figure 21:
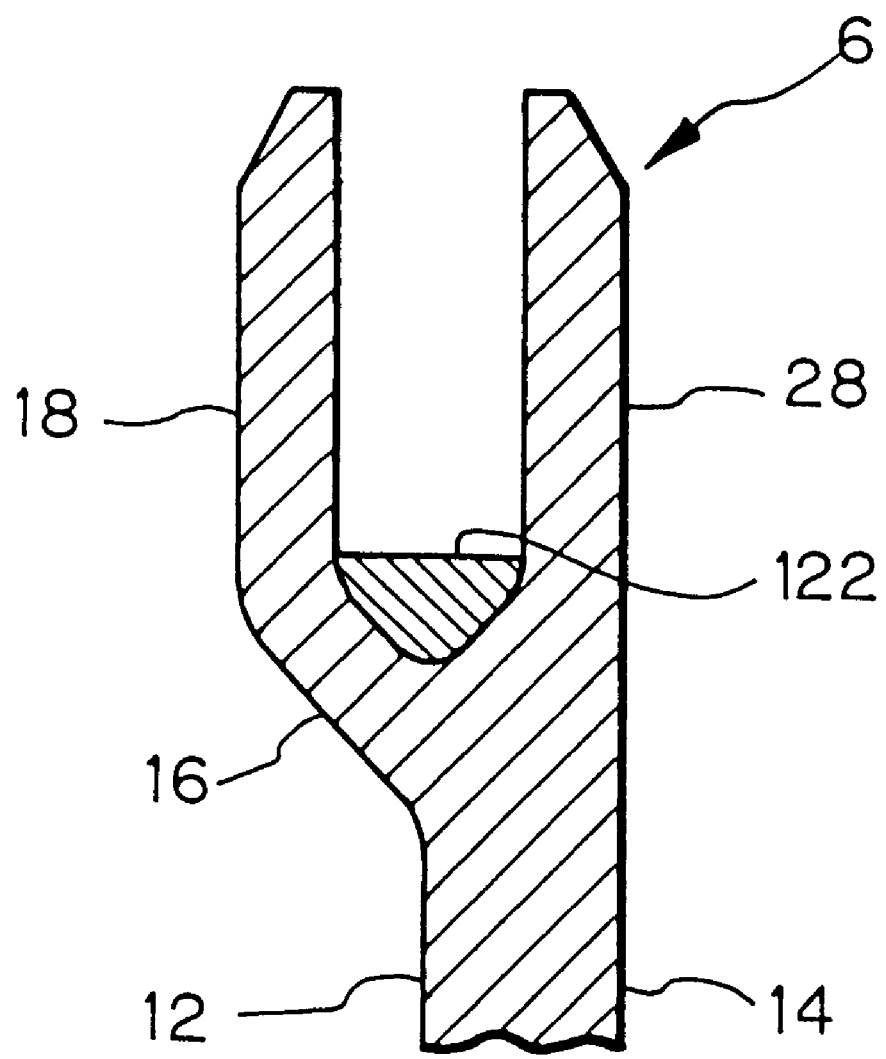
FIG. 21 is a sectional view, on an enlarged scale, of part of the sprocket shown in FIG. 20.

Next, a sprocket according to a fourth embodiment of the present invention will next be described with reference to FIGS. 20 and 21. With the sprocket according to the fourth embodiment of the present invention, as in the case of the third embodiment, a flexible and elastic rubber annular cushioning material 122 is provided as noise reduction means along the entire circumference of the sprocket. Therefore, noise generated by contact between the sprocket and the chain upon engagement between the chain and the sprocket can be suppressed. In this embodiment, the cushioning material 122 need not be provided along the entire circumference of the sprocket. The cushioning material may be provided in each of the recesses between the teeth.

Although the present invention has been described with respect to its preferred embodiments, various modifications may be made without departing from the scope of the invention as defined by the appended claims.

What is claimed is:

1. A method for manufacturing a sprocket, the method comprising:
   a first step of preparing a workpiece having a predetermined thickness, said workpiece having a peripheral edge; and
   a second step of forming a plurality of teeth on the peripheral edge of said workpiece at given intervals, while at the same time, making said teeth thicker than said workpiece.

2. A method according to claim 1, wherein said second step includes a rotary pressing process.

3. A method according to claim 1, wherein said second step is performed by a rotary press machine.

4. A method according to claims 3, wherein said rotary press machine comprises a tooth forming tool pressed against the workpiece while being rotated, drive means for rotating said tooth forming tool, and transfer means for reciprocally moving said tooth forming tool and said drive means relative to the workpiece.

5. A method according to claim 4, wherein said tooth forming tool includes a press member pressed directly against substantially centrally the peripheral edge of the workpiece, and a tooth forming member for holding said press member in place.

6. A method according to claim 5, wherein said tooth forming member includes an annular body having a peripheral edge, and a plurality of projections integrally formed on the peripheral edge of said body of said tooth forming member.

7. A method according to claim 6, wherein said press member extends along a circumference of said tooth forming member and is located centrally in said body.

8. A method according to claim 7, wherein said press member includes a body extending outwardly from the peripheral edge of said body of said tooth forming member, and an edge extending outwardly from said body of said press member.

9. A method according to claim 8, wherein said body of said press member is tapered outwardly from said peripheral edge of said body of said tooth forming member to one end of each of said projections, and said edge of said press member is tapered outwardly from said body of said press member and extends beyond said projections.

10. A method according to claim 9, further comprising the steps of:
    placing the workpiece adjacent to said rotary press machine; and
    positioning the workpiece so that the workpiece is arranged in parallel to said tooth forming tool;
    gradually moving said tooth forming tool relative to the workpiece during rotation of said tooth forming tool, wherein the workpiece is caused to rotate upon contact with said tooth forming tool, said edge of said press member and said projections of said tooth forming member being brought into local contact with the workpiece to cause repeated plastic deformation of the workpiece.

11. A method for manufacturing a sprocket, the method comprising:
    a first step of preparing a workpiece, said workpiece having a peripheral edge; and
    a second step of forming a plurality of teeth on the peripheral edge of said workpiece at given intervals, said teeth having a thickness greater than that of said workpiece and further forming a groove in the peripheral edge extending through the plurality of teeth when forming the plurality of teeth.

12. A method for manufacturing a sprocket, the method comprising:
    preparing an annular workpiece having a peripheral edge and a workpiece body;
    forming a plurality of teeth in the peripheral edge of said workpiece such that said teeth are spaced at predetermined intervals, wherein a distance between opposite outer sides of each of said teeth defines a thickness that is greater than the thickness of said workpiece body; and forming a groove in the peripheral edge of said workpiece such that said groove extends through said teeth, wherein said groove and said teeth are formed simultaneously.

13. A method according to claim 12, wherein said plurality of teeth are formed with a rotary press.

14. A method according to claim 12, wherein said plurality of teeth are formed with a rotary press having a tooth forming tool, a motor for rotating said tooth forming tool, and a transfer unit for moving said tooth forming tool and said motor relative to said workpiece.

15. A method according to claim 12, further comprising attaching a spacer to a side of said workpiece body such that an outer surface of said spacer is flush with one of the outer surfaces of said teeth.

16. A method according to claim 12, wherein said teeth are formed in the peripheral edge of said workpiece so that one of said sides of said teeth are flush with respect to one side of said workpiece body.

* * * * *